United States Patent [19]

Müller et al.

[11] Patent Number: 4,519,572
[45] Date of Patent: May 28, 1985

[54] VALVE DEVICE, ESPECIALLY FOR DIE CASTING MACHINES

[75] Inventors: Hans-Jürgen Müller; Hans-Gebhard Krines, both of Usingen, Fed. Rep. of Germany

[73] Assignee: Vickers, Incorporated, Troy, Mich.

[21] Appl. No.: 409,163

[22] Filed: Aug. 18, 1982

[51] Int. Cl.³ .............................................. F16K 31/12
[52] U.S. Cl. ........................................ 251/29; 251/25; 251/337; 251/285; 137/509
[58] Field of Search .................. 251/29, 44, 25, 63, 251/337, 285; 137/509

[56] References Cited

U.S. PATENT DOCUMENTS 2,021,427 11/1935 Peo .................................... 251/29 X
2,619,103 11/1952 Davies et al. ..................... 251/29 X
2,830,785  4/1958 Buri ...................................... 251/29
3,159,375 12/1974 Schrecongost et al.

FOREIGN PATENT DOCUMENTS 2058112 5/1972 Fed. Rep. of Germany.
7604336 7/1976 Fed. Rep. of Germany.

Primary Examiner—Larry Jones
Attorney, Agent, or Firm—Barnes, Kisselle, Raisch, Choate, Whittemore & Hulbert

[57] ABSTRACT

A valve device, especially for die casting machines. The device comprises a control drive and a control member which is arranged between the control drive and the valve cone, and which converts the rotary movement of the control drive into an axial stroke movement. The object of the invention is to provide a quick acting valve device with which the adjustable limited opening of the valve cone can, with the aid of small manual or motor forces, be effected with structurally simple means in a space saving device housing in the direct drive. For this purpose, the control member which serves to adjust the opening limitation of the valve cone is a threaded sleeve which engages in a thread of the valve housing. Every time the working surfaces of the valve cone are acted upon by pressure, different hydraulic pressures are exerted upon the oppositely located end faces of the threaded sleeve for releasing the sides of the threads of the sleeve from the sides of the threads of the housing.

14 Claims, 5 Drawing Figures

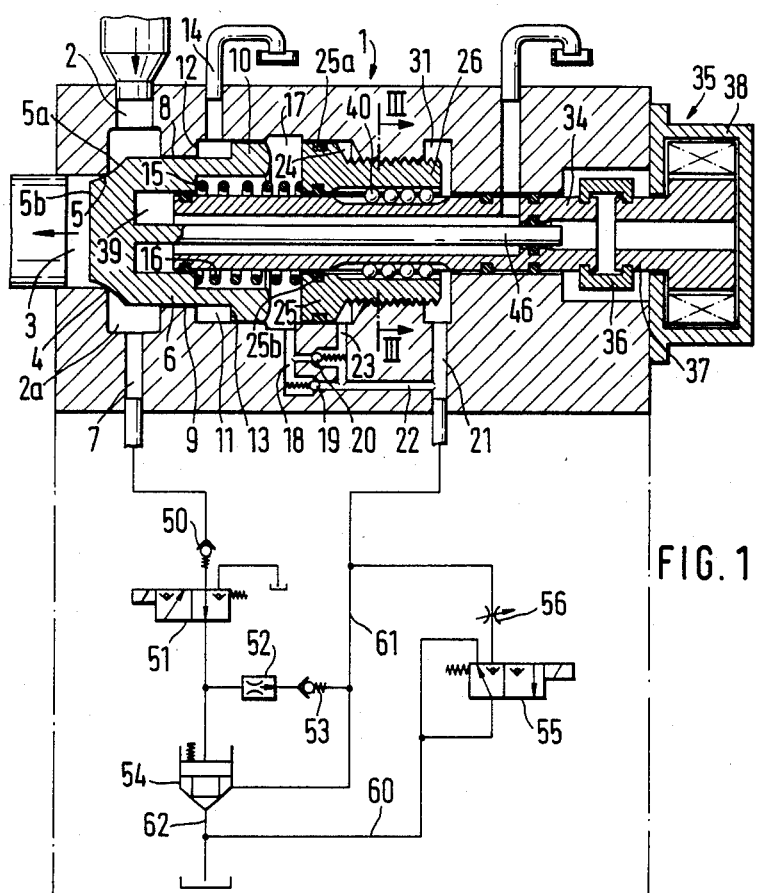
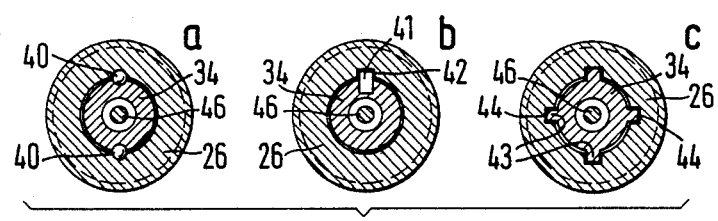
FIG. 1
FIG. 3

VALVE DEVICE, ESPECIALLY FOR DIE CASTING MACHINES

The present invention relates to a valve device, especially for die casting machines, and has a control drive and a control member to adjustably limit the opening of the valve cone; the control member is arranged between the control drive and the valve cone, and engages in a thread of the valve housing.

German Gebrauchsmuster No. 76 04 336 discloses a valve device, for example for heating units, cooling units, or the like, which has a valve stem which carries out a stroke movement. The valve stem can be actuated by an adjusting drive fastened to the valve, with the adjusting drive being a standard loader, and with a transmission being arranged between the drive shaft of the motor and the valve stem for converting the torque into a stroke movement. German Offenlegungsschrift No. 20 58 112 further discloses a device for controlling the connection of the multiplier of press plungers of multiplier die casting machines. With this device, the opening movement of a closure piston is adjustable by a handwheel which acts on a longitudinal spindle. When the handwheel is turned, with the aid of the spindle, a longitudinal displacement of the spindle, and thereby an adjustment of the opening displacement of the valve cone, is effected. Thus, German Offenlegungsschrift No. 20 58 112 and German Gebrauchsmuster No. 7 507 127 disclose valve devices in which the valve cone is adjustable by a control member which engages in a thread of the valve housing or of a part of the valve housing.

In contrast to these heretofore known devices, it is an object of the present invention to provide a quick acting valve device with which the adjustable opening limitation of the valve cone can be effected with the aid of small manual or motor forces with structurally simple means in a space saving device housing in the direct drive.

This object, and other objects and advantages of the present invention, will appear more clearly from the following specification in connection with the accompanying drawings, in which:

FIG. 1 shows one embodiment of the inventive device with a first type of control;

FIGS. 3a–c show connections between the threaded sleeve and the shaft of the control drive.

Figure 2:
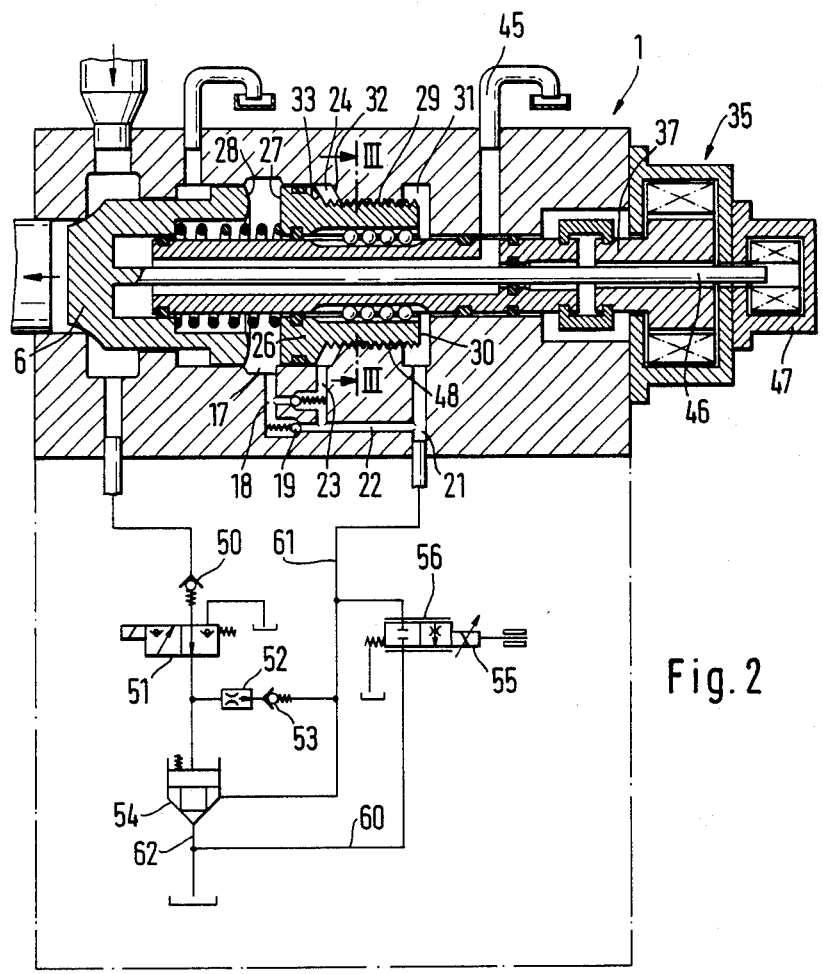
FIG. 2 shows another embodiment of the inventive device with a displacement pickup for the electrical control circuit and with a second type of control or regulator.

The valve device of the present invention is characterized primarily in that the control member is a threaded sleeve, with the external threads of the threaded sleeve engaging in the threads of the valve housing, and with, every time pressure acts on the working surfaces of the valve cone, different hydraulic pressures being exerted on the opposite end faces of the threaded sleeve for releasing the sides of the thread of the sleeve from the sides of the thread of the housing.

According to specific features and further improvements of the present invention, that end face of the threaded sleeve remote from the valve cone projects into a pressure chamber which has a higher pressure than does the pressure chamber in which projects the end face of the sleeve which faces the valve cone. The threaded sleeve may have an annular shoulder, with the narrow sleeve portion being provided with the threads, and with the wide sleeve portion supporting at least one circumferential or gap seal. The threaded sleeve may be connected with the shaft of the control drive in such a way as to be longitudinally displaceable yet non-rotatable relative thereto by means of internal grooves and keys, balls, rollers, or the like. An axial compression spring may be arranged between the threaded sleeve and the valve cone. A first check valve, which acts as a differential pressure valve, may be arranged between the pressure chambers which are arranged axially ahead of and behind the threaded sleeve. For rapid relief of the chamber arranged ahead of the valve cone, a second larger check valve which acts opposite to the first check valve may be arranged between the pressure chambers ahead of and behind the threaded sleeve; both pressure chambers may be connected with a common pressure and relief line. The valve cone may be provided with a shaft which passes through the hollow shaft of the control drive; the free end of the shaft of the valve cone may project as a control lug through the rotating part of the motor or manual drive into a displacement pickup for position control of the valve cone. The overall valve mechanism may be embodied as a cylindrical stepped detachable cartridge which can be inserted into a valve housing.

The advantage of the inventive device consists in that the threaded sleeve, which limits the opening path of the valve cone, can, for instance by an economical electrical drive in the form of a preferably remotely controlled stepping motor having low torque, be effected in the direct drive, or that with manual actuation the sleeve also only has to establish a small torque. The inventive device proceeds from the idea of the hydraulic pressure equalization between the two effective end faces of the threaded sleeve, so that as a result of the motor or manual drive force only the mechanical frictional forces and the spring forces have to be overcome. For this purpose, every time that the valve cone is acted upon by pressure, i.e. every time the valve is closed, the threads of the threaded sleeve are lifted from the adjacent sides of the thread of the housing, whereby necessarily a lubrication of the sides of the threads, the threads of the sleeve, and the threads of the housing is effected, so that the inventive adjustment or displacement of the threaded sleeve only requires that the mechanical frictional forces and spring forces be overcome, and it is not necessary, as was the case with the heretofore known devices, to release the threads of the sleeve and of the housing which, as a result of the high pressing effect of the sides of the threads, have "dry bonded" to one another.

Referring now to the drawings in detail, the overall valve mechanism of the inventive device is embodied as a cylindrical cartridge and forms an interchangeable structural unit with the individual valve parts which are to be described subsequently. The bore 2 of the housing 1 communicates for instance with a non-illustrated feed or supply line of a pressure reservoir of a die casting machine, while the axial bore 3 of the housing 1 communicates with the cylinder chamber. The bores 2 and 3 can also serve other purposes. The inner end of the bore 3 forms the annular valve seat 4; when the valve is closed, the recessed head surface 5 of the valve cone 6 rests against this valve seat 4. The arrangement and construction of the valve seat 4 and the recessed head surface 5 is such that when the valve is closed, the pressure in the line 2 and in the annular chamber 2a acts on the projected diametral surface of the portion 5a of the head surface 5.

At the same height as the bore 2, the housing 1 has a further bore 7 which, in front of the bore 3, can also be closed off by the valve cone 6. The valve cone 6 has a hollow cylindrical shape, and its outer wall is guided on a portion 8 of the longitudinal bore 9 of the housing 1. The back end of the valve cone 6 has an annular thickened portion 10 which is directed radially outwardly; the bore 9 has a corresponding widened portion 11. In this way, on the one hand an annular shoulder 12 is formed on the housing 1 and an annular shoulder 13 is formed on the valve cone 6. An annular chamber results between the shoulders 12 and 13 in the widened portion 11 of the bore 9. This annular chamber is kept free of pressure via the bore 14. At the same time, the back thickened portion 10 increases the effective back end face of the valve cone 6 relative to the effective front end face thereof. The inner wall of the hollow valve cone 6 similarly forms a shoulder 15, which forms one abutment of a spring 16 which will subsequently be described in detail.

The widened portion 11 of the bore 9 merges into a valve chamber 17, into which opens a bore 18 which communicates with a bore 21 via a first check valve 19 and a second oppositely directed check valve 20. The bore 21 in turn communicates with a further chamber 24 via the bores 22, 23.

The head 25 of a threaded sleeve or bushing 26 is displaceably and sealingly arranged in the widened portion of of the bore 9. The end face 27 (FIG. 2) of the head 25, as well as the back end face 28 of the valve cone 6, are both under the effect of the pressure in the chamber 17 and in the bore 18. The external threads of the threaded sleeve 26 engage in the internal threads 29 of the valve housing 1. The back end face 30 of the threaded sleeve 26 (FIG. 2) is under the effect of the pressure in the chamber 31; this pressure is also present in the bore 21 as well as, via the bores 22, 23, in the chamber 24, which is axially delimited by the shoulder 32 of the housing 1 and the shoulder 33 of the threaded sleeve 26. The second end of the axial compression spring 16 rests against the end face 27 of the threaded sleeve 26. The spring 16 may also be provided with an axial abutment or thrust bearing for reducing the frictional turning forces.

The adjusting or control drive for the threaded sleeve 26 is designated generally by the reference numeral 35. The shaft 34 of the control drive 35 is mounted in the valve housing 1. In this connection, the shaft 34 is connected with the drive shaft 37 of the control drive 35 by means of a clutch or coupling member 36. The control drive 35, which may, for example, be a stepping motor having a small torque, is arranged in the housing 38. The front end of the shaft 34 sealingly projects into the inner chamber 39 of the valve cone 6, and is surrounded by the spring 16. The threaded sleeve 26 is also sealed off relative to the shaft 34, with which it is non-rotatably connected. According to FIG. 3a, this connection of the threaded sleeve 26 with the shaft 34 is effected by a plurality of axial ballraces 40. According to FIG. 3b, the non-rotatable connection between the parts 26 and 34 can be effected by a pin 41 which engages in a corresponding groove 42. Finally, according to FIG. 3c, the non-rotatability of the threaded sleeve 26 relative to the shaft 34 is accomplished by keys 43 and grooves 44.

The inner chamber 39 of the valve cone 6, and the inner chamber of the shaft 34, are kept free of pressure by means of a bore 45 (FIG. 2). In addition to resting on the wall of the bore 9 and of the widened portion 11, the guidance of the valve cone 6 is effected by an axial rod 46 which is guided within the shaft 34.

In FIG. 2, this axial rod 46 passes through the shaft 37 of the control drive 35 and ends in a displacement pickup 47 by means of which a position control regulation of the valve cone 6 of the valve control, which is to be described below, can be effected.

The threaded sleeve 26, and especially its threads 29 and the counterthreads 48 (FIG. 2) of the housing 1, are important to the present invention. In this connection, the check valve 19 acts as a differential pressure valve between the chamber 17 in front of (i.e. left in FIGS. 1 and 2) the threaded sleeve 26, and the chamber 31 behind (i.e. to the right of) the threaded sleeve 26. When pressure is imparted in the bore 21, this pressure results in the chamber 31, while a lower pressure is present in the chamber 17 due to the check valve 19; as a result, the threaded sleeve 26 is pressed to the left in FIGS. 1 and 2, with the sides of the threads 29 of the sleeve 26 being lifted from the sides of the threads 48 against the action of the spring 16, and with these sides being repeatedly provided with a lubricating film. To shift the sleeve 26, as a result of which the stroke of the valve cone 6 can be changed, only small forces are therefore necessary on the shaft 34, since the only forces to be overcome are the frictional forces between the threads 29 and 48 and the seals, and the spring forces 16, 19, and 20. A sticking or seizing of the thread sides against one another is rendered impossible by repeating the aforementioned process after each time the thread sides are acted upon with pressure.

Since the end face 28 of the second portion 10 together with the shoulder surface 15 form a greater surface than do the projected surfaces of the portions 5a and 5b (FIG. 1), this results in the necessary differential pressure effect for the closing process of the valve cone 6.

In order to assure the pressure differential between the chamber 17 on the one hand and the chamber 24 and 31 on the other hand, the widened head 25 of the sleeve 26 is provided with two seals 25a and 25b, which can be embodied as circumferential or gap seals.

The circuit diagram of FIG. 1 provides a check valve 50 which is connected with the bore 7 in the form of a control pressure relief valve, so that the valve cone 6 remains closed even if the principal pressure in the bore 2 suddenly escapes. An electrically actuated path seating valve 51 which is free of leak oil is connected to the valve 50 as a preliminary control stage for the sudden opening of the valve cone 6. A flow regulating valve 52 is provided for the limited control oil supply for the slow opening and closing movements of the valve cone 6. The flow regulating valve 52 is connected with a check valve 53 which serves to separate the control oil flow between the path seating valve 51 and the main control valve 54. When the main control valve 54 is actuated by the pilot valve 51, a sudden opening movement of the valve cone 6 is effected. An electrically actuated path seating valve 55 which is free of leak oil is connected with the output 62 of the main control valve 54. A flow control valve 56 for manual preselection of the slow opening movement of the valve cone 6 is connected ahead of the path seating valve 55, and is connected with the bore 21 of the housing 1.

Operation during slow opening of the valve cone 6 takes place as follows:

When the path seating valve 55 is actuated, more control oil can flow out through the bore 21 and the flow control valve 56 over the line 60 than can flow through the check valve 50, the path seating valve 51, the flow regulating valve 52 and the check valve 53. As a result, a pressure drop is achieved in the bore 21 and in the chamber 17 by means of the check valve 20. This pressure drop effects movement of the valve cone 6 in the direction of opening due to the higher pressure on the portion 5a. When the pressure is reversed, a closing of the valve cone 6 is effected.

Rapid opening of the valve cone 6 can succeed the slow opening process at any time. If for this purpose the path seating valve 51 is activated and the previously closed main control valve 54 is opened, the control flow escapes from the chamber 17 through the check valve 20, the bore 21, the line 61, and the open main control valve 54 and the outlet 62 with a larger escape cross section than that of the flow control valve 56.

In the embodiment according to FIG. 2, the arrangement of the circuit diagram is the same as in FIG. 1, except that the free end of the axial rod 46 acts as a control lug on an electrical displacement pickup 47.

The flow control valve 56 and the path seating valve 55 are replaced by an electrical, proportionally adjustable unit having position control. In this way it is possible to regulate the slow opening and closing of the valve cone 6 as desired; in other words, it is possible to achieve a rated-actual-value agreement of the valve cone 6 via the displacement pickup 47.

The rapid opening of the main control valve 54 is effected in the manner previously described.

Although the path seating valves 51 and 55 are described as being activated electrically, it would also be possible to actuvate them pneumatically or hydraulically.

The present invention is, of course, in no way restricted to the specific disclosure of the specification and drawings, but also encompasses any modifications within the scope of the appended claims.

What we claim is:

1. Valve arrangement, especially for pressure die casting machines, with the following features:
   arranged in a valve housing is a main valve with a valve cone, a control piston and a stroke-limiting stop;
   the stroke-limiting stop can be adjusted by means of a drive mechanism, which comprises a threaded bushing and a support thread arranged on the valve housing;
   a control valve device, which also contains throttle devices, is connected by at least one control line to the main valve, so that the valve cone of the latter can execute a delayed or a quick movement;
   characterized in that the threaded bushing has pressurized surfaces, on which counteracting displacement forces, in the support direction or in the release direction, develop onto the threaded bushing, the relative size of said displacement forces to one another changing with every switching cycle of the valve cone.

2. The valve arrangement according to claim 1 characterized in that the surfaces pressurized in the release direction border on chamber arrangements, which are connected to the control line and via nonreturn valves, connected in opposite directions, to a valve control chamber, which contains the surface, of the threaded bushing, pressurized in the support direction and the control piston.

3. The valve arrangement according to claim 1 or 2, characterized in that the stroke-limiting stop and the threaded bushing are integrated in a single construction, the stroke-limiting stop containing on one side the surface pressurized in the support direction and on the other side a partial surface of the surfaces pressurized in the release direction, which surfaces are sealed from one another.

4. The valve arrangement according to one of claims 1 or 2, characterized in that the drive mechanism comprises a shaft, with which the threaded bushing is connected so as to be non-rotational but axially displaceable.

5. The valve arrangement according claim 4, characterized in that the shaft is hollow and accommodates an axle, one end of which is connected to the valve cone, whereas the other end is part of a displacement transducer.

6. The valve arrangement according to one of claims 1 or 2, characterized in that the stroke-limiting stop is at the same time designed as a thrust block for a valve spring of the main valve.

7. The valve arrangement according to one of claims 1 or 2, characterized in that the control valve device has a pressure feed line which can be shut off, a circuit from flow-control valve and adjustable throttle, to the connecting point of which is connected the control line, and a discharge valve, which, when the pressure feed line is shut off, suddenly opens and depressurizes the control line whereas when the pressure feed line of the control line is connected through, pressure oil is fed via the flow-control valve and, if necessary, pressure oil is conducted away via the adjustable throttle.

8. A valve arrangement comprising
   a valve housing;
   said valve housing having an interior space, a fluid inlet port for admitting fluid under pressure, a fluid outlet port for directing fluid under pressure out of said housing, a valve seat arranged between inlet port and outlet port, a drain port, a control port for admitting control pressure fluid to a control chamber and a stationary thread located in said interior space and having opposed flanks of thread,
   a main valve in said interior space,
   said main valve having a valve member adapted to cooperate with said valve seat, a stroke-limiting stop means, said valve member taking a first end position when engaged on said valve seat, and a second end position when engaged by said stroke-limiting stop means, a control piston connected to said valve member and movable in said control chamber to control said end positions of said valve member,
   a drive mechanism,
   said drive mechanism including said stationary thread, an adjustable threaded bushing connected to said stroke-limiting stop means and meshing with said stationary thread, said threaded bushing separating a control fluid admission space from said control chamber in said interior space, and a rotary driving means connected to said threaded bushing to rotate and adjust same in said interior space,
   a control valve device,
   said control valve device being connected to said control port and being adapted to produce a first control pressure sufficient to move said control piston and said valve member onto said valve seat, and a second control pressure which is low enough so that said control piston is moved by said fluid pressure onto said stroke-limiting stop means, and a pressure differential means, said pressure differential means being arranged between said control fluid admission space and said control chamber so that when said first control pressure is admitted to said fluid admission space, said threaded bushing is shifted in one direction between the limits of said opposed flanks of said stationary thread and when said second control pressure is admitted to said control chamber and said control piston is moved against said stroke-limiting stop means, and said threaded bushing is shifted in the other direction between the limits of said opposed flanks of said stationary thread.

9. A valve arrangement set forth in claim 8 wherein said pressure differential means is a check valve arranged in a direction to admit fluid from said control port to said control chamber.

10. A valve arrangement set forth in claim 8 wherein said stroke-limiting stop means and said threaded bushing form an integral member.

11. A valve arrangement set forth in claim 8 wherein said drive mechanism comprises a shaft connected to said threaded bushing by a coupling means which allows a shifting movement of said threaded bushing relatively of the shaft in an axial direction, but no rotational movement between said threaded bushing and the shaft.

12. A valve arrangement set forth in claim 11 wherein said shaft is hollow to accommodate a rod connected to said valve member, said rod having a free end which cooperates with a position transducer.

13. A valve arrangement set forth in claim 8 comprising a valve spring, wherein said stroke-limiting stop means is constructed as a support for said valve spring.

14. A valve arrangement set forth in claim 8 wherein a pressure line including a shut off valve is provided to supply pressure fluid to said control valve device, said control valve device also comprising a flow control valve and a variable restrictor arranged in series in a line leading to tank, said line, between said flow control valve and said adjustable restrictor, being connected to said control port and a discharge valve, said discharge valve being pilot operated by said shut off valve when said shut off valve is closed.

* * * * *